United States Patent [19]

Seeba

[11] Patent Number: 5,048,655
[45] Date of Patent: Sep. 17, 1991

[54] ELECTRIC DECLUTCH MECHANISM FOR DIRECT DRIVE CRAWLER

[75] Inventor: Alan L. Seeba, Dubuque, Iowa
[73] Assignee: Deere & Company, Moline, Ill.
[21] Appl. No.: 527,226
[22] Filed: May 22, 1990
[51] Int. Cl.$^5$ ............................................. F16D 25/00
[52] U.S. Cl. ............................ 192/0.075; 192/0.096; 192/3.58; 192/85 R; 74/869; 475/123
[58] Field of Search ................ 192/0.07, 0.075, 0.096, 192/358, 85 R, 87.14, 87.18, 87.19; 74/335, 867, 868, 869; 475/123

[56] References Cited

U.S. PATENT DOCUMENTS

| | | | |
|---|---|---|---|
| 4,618,043 | 10/1986 | Hattori et al. | 192/0.075 X |
| 4,768,636 | 9/1988 | Ito et al. | 192/3.58 X |
| 4,827,805 | 5/1989 | Moan | 192/3.58 X |
| 4,941,372 | 7/1990 | Aoki et al. | 74/335 X |
| 4,957,015 | 9/1990 | Ishikawa et al. | 74/867 X |
| 4,957,016 | 9/1990 | Amedei et al. | 74/335 X |
| 4,966,050 | 10/1990 | Schulz et al. | 74/867 |
| 4,972,739 | 11/1990 | Ueki et al. | 74/867 X |

FOREIGN PATENT DOCUMENTS 88230 5/1923 Japan .................................. 192/3.58

Primary Examiner—Leslie A. Braun
Assistant Examiner—Andrea Pitts

[57] ABSTRACT

The invention comprises mechanism for reducing hydraulic pressure on the engaged forward or reverse clutch when the decelerator pedal is fully depressed. The mechanism comprises an electric switch that is coupled to the decelerator pedal linkage for energizing a solenoid valve. The solenoid valve couples the modulation accumulator of the power shift tranmission to sump when the electric switch is closed. This decreases the hydraulic pressure on the engaged forward or reverse clutch so that it can slip if braking force is applied to the vehicle.

12 Claims, 4 Drawing Sheets

ELECTRIC DECLUTCH MECHANISM FOR DIRECT DRIVE CRAWLER

BACKGROUND OF THE INVENTION

1. Field of the Invention

The invention is directed to a mechanism for declutching a direct drive crawler by depressing the decelerator pedal.

2. Description of the Prior Art

Many work vehicles, such as crawler dozers and loaders, are provided with fluid drives for transmitting rotational speed and torque from the engine to the gear train of the final drives. One type of fluid drive is a torque converter which acts as a clutch connecting and disconnecting power between the engine and gear train, and as a transmission providing a greater number of speed ratios. Hydrostatic transmissions are another type of fluid drive that directs rotational torque from the engine to the gear train of the final drives.

In inching or slowly moving a work vehicle close to an object, an operator of a torque converter work vehicle controls the movement of the vehicle through a decelerator pedal. The decelerator pedal controls the output of the engine and therefore the amount of rotational torque and speed being applied to the torque converter. When the decelerator pedal is completely depressed, the vehicle can be stopped, without stalling the engine, by depressing the brake pedal.

Direct drive work vehicles are more efficient than torque converter vehicles, however the operator needs to manipulate three pedals when operating in close quarters. More specifically, fully depressing the decelerator pedal does not declutch the engine from the gear train. To get close to an object, the operator first depresses the decelerator pedal to slow the vehicle. Then the operator depresses the clutch pedal to declutch the engine and prevent stalling the vehicle, and depresses the brake pedal to stop the vehicle.

SUMMARY

It is an object of the present invention to provide a simple mechanism for declutching a direct drive work vehicle by depressing the decelerator pedal.

It is another object of the present invention to provide a mechanism that is coupled to a power shift transmission modulation circuit so that the clutch is reengaged in a modulated fashion.

It is a feature of the present invention that the clutches which are engaged and disengaged by the mechanism are the forward or reverse clutches of the power shift transmission so that the vehicle can be decelerated without shifting the direct drive transmission when inching the work vehicle.

The present invention comprises a solenoid valve that is fluidly coupled between the modulation accumulator of the power shift transmission and sump. The solenoid valve is electrically coupled to a switch which is mounted to the decelerator pedal linkage for energizing the solenoid when the decelerator pedal is completely depressed. When the solenoid valve is energized the modulation accumulator is coupled to sump through the valve body of the detent spool of the speed control valve. When the modulation accumulator is coupled to sump, hydraulic pressure on the engaged forward or reverse clutch is reduced, thereby permitting these clutches to slip.

DETAILED DESCRIPTION

Figure 1:
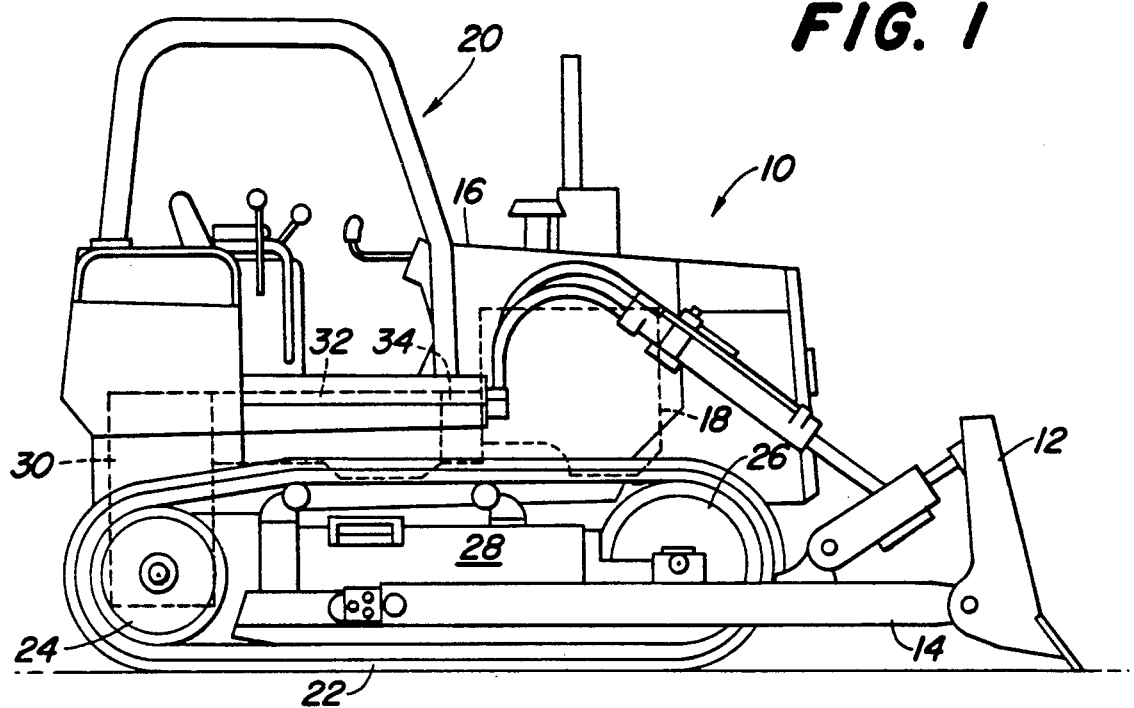
FIG. 1 is a side view of a crawler work vehicle.

FIG. 1 illustrates a crawler tractor 10 having a dozer blade 12 suitably coupled to the crawler by linkage 14. The vehicle is provided with a frame 16 which houses internal combustion engine 18 (in phantom lines) and defines operator's station 20. The vehicle is propelled by tracks 22 which engage rear main drive sprockets 24 and idler sprockets 26. The tracks are driven by the main drive sprockets 24. The track is tensioned by tension and recoil assembly 28.

The main drive sprockets 24 are coupled to clutch brake steering system 30 (shown in phantom lines) which in turn is coupled to power shift transmission 32 (also shown in phantom lines). The power shift transmission 32 is coupled to internal combustion engine 18 by main clutch 34.

Although the present invention is being described as being mounted to a steel tracked crawler dozer, to which it is particularly well suited, the invention can be used on any direct drive work vehicle.

Figure 2:
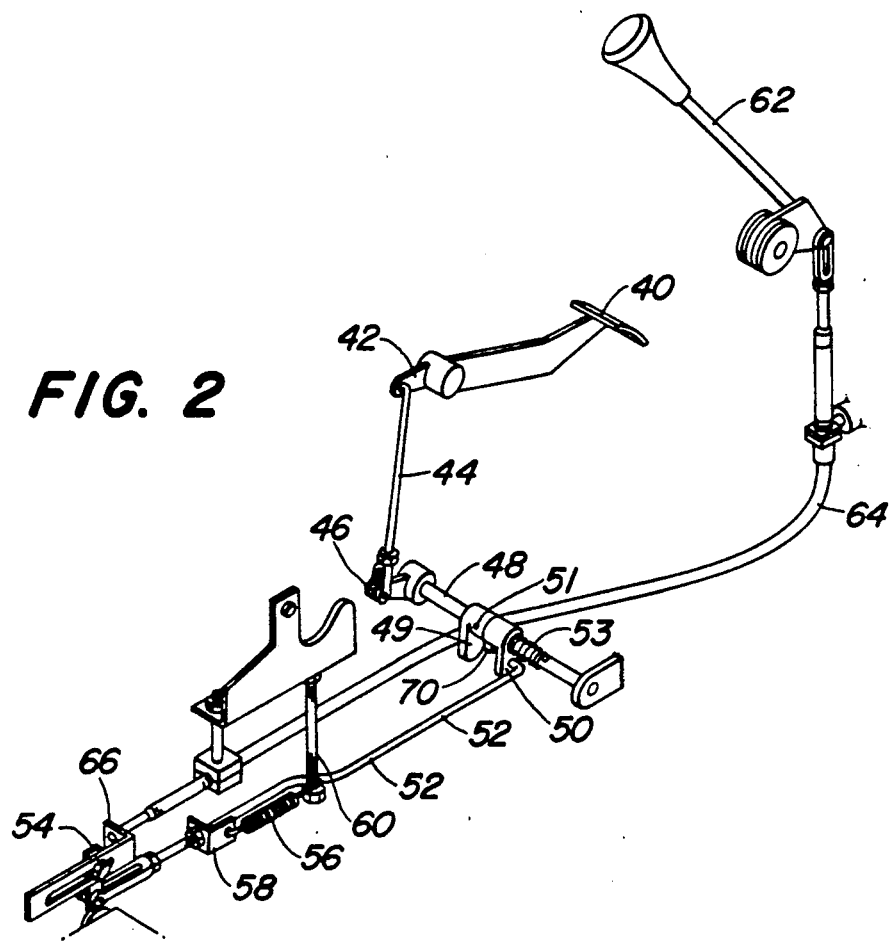
FIG. 2 is a perspective view of the decelerator pedal linkage.

FIG. 2 illustrates the fuel injection control linkage comprising the decelerator pedal linkage and the throttle control linkage. The decelerator pedal linkage comprises a pedal 40 that is provided with first bell crank 42. The pedal is pivotally coupled to the floor of the operator's station. Link 44 is coupled to the first bell crank 42 and drives second bell crank 46. Second bell crank 46 is mounted to shaft 48.

Shaft 48 pivots a third bell crank 49 that is pinned to the shaft 48 by a pin 51. A fourth bell crank 50 is pivotally mounted to the shaft 48 adjacent to the third bell crank 49. The fourth bell crank 50 is provided with a tang (not shown) on which is mounted an electric switch 70. The plunger of the electric switch is forced into contact with the third bell crank 49 by spring 53. One end of the spring 53 is fixedly mounted to the shaft 48, and the other end of the spring is mounted to fourth bell crank 50.

The fourth bell crank 50 is coupled to a link 52. The link 52 is coupled to the fuel injection control lever 54 which controls the flow of fuel to the internal combustion engine. The pedal is biassed into an up or undepressed position by a spring 56 that is coupled to the link 52 by an angle iron member 58. The spring is coupled to the frame of the vehicle by a bolt 60.

The throttle control linkage comprises the throttle control lever 62 which is pivotally coupled to the frame of the vehicle. The throttle control lever manipulates a push-pull cable 64. The push-pull cable is coupled to the injection control lever 54 by a slotted plate 66. The elongated slot in the plate provides a lost motion connection between the push-pull cable and the injection control lever. This lost motion connection allows the decelerator pedal to override the engine output set by the throttle.

When an operator depresses decelerator pedal 40, the shaft 48 is rotated clockwise. The third bell crank 49 is similarly rotated in the clockwise direction. The spring 53 biases the fourth bell crank 50 towards the third bell crank so that is follows the clockwise rotation of the third bell crank 49. As the fuel injection control lever 54 reaches its extreme low idle position, as dictated by a stop on the fuel injector, the third bell crank 49 separates from the fourth bell crank 50. This is caused by the stop on the fuel injector acting through the link 52 to prevent further rotation of the fourth bell crank 50. As the third and fourth bell cranks separate, the plunger of the electric switch 70 is no longer depressed by contact with the third bell crank 49 thereby closing the electric switch 70. The electric switch 70 then energizes solenoid valve 136.

Figure 3:
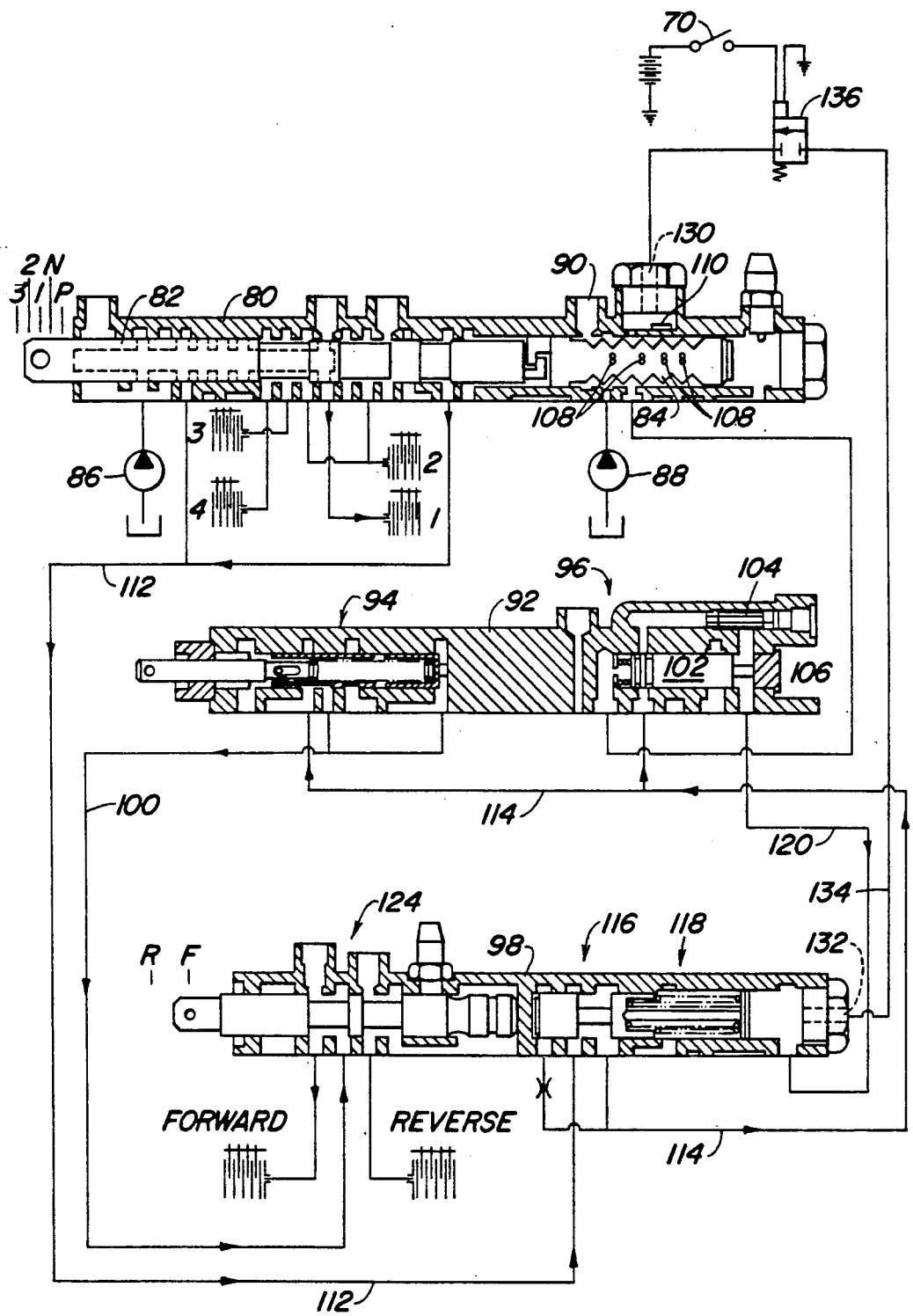
FIG. 3 is a schematic view of the power shift transmission in first gear.
Figure 4:
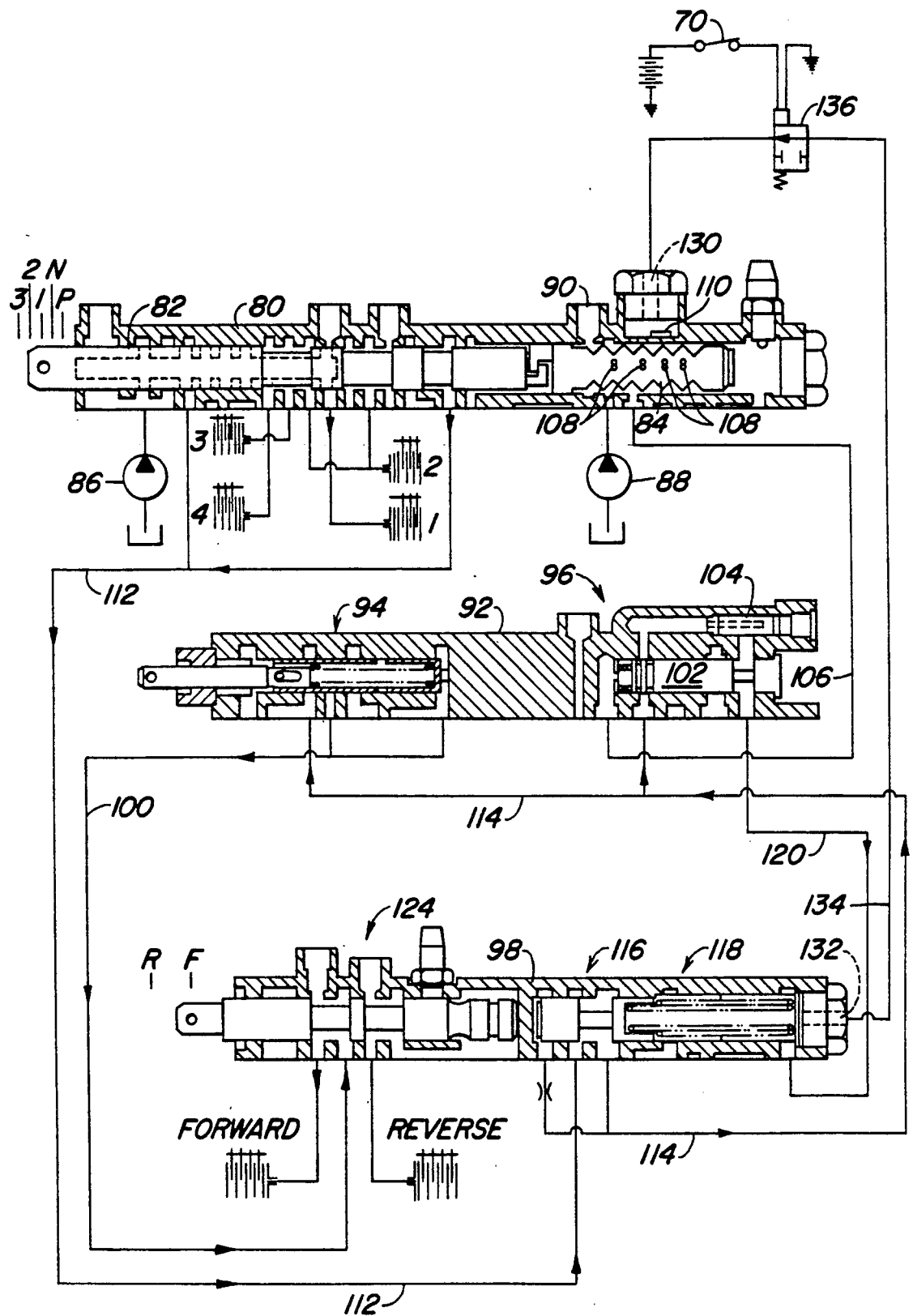
FIG. 4 is a schematic view of the power shift transmission after the declutching trigger switch has been depressed.

FIGS. 3 and 4 illustrate the control valves of the power shift transmission driving the vehicle in first gear. The top most valve body 80 comprises speed control spool 82 and detent spool 84. The speed control spool 82 is provided with pressurized hydraulic fluid from pressurized hydraulic fluid source 86. Detent spool 84 is supplied pressurized hydraulic fluid from pressurized hydraulic fluid source 88.

In response to an operator shifting the speed control spool pressurized fluid from source 86 is selectively applied to hydraulic clutch packs for the first, second, third or fourth gears. In FIGS. 3 and 4 the speed control spool 82 is shifted into first gear for applying pressurized hydraulic fluid to the first gear hydraulic clutch pack.

As the speed control spool is shifted so is the detent spool 84. In the first gear position illustrated in FIGS. 3 and 4, the detent spool routes pressurized hydraulic fluid from source 88 to the steering valve and the steering brake pistons through port 90.

The second valve body 92 houses two valves, the clutch valve 94 and the sump valve 96. The clutch valve 94 is shifted by the operator for providing pressurized hydraulic fluid to the third valve body 98 through line 100 for engaging the forward or reverse clutch.

The sump valve is provided with a spring biassed sump spool 102 and rate of shift orifices 104. The rate of shift orifices control the speed of the modulation cycle. That is the orifices 104 control how fast the forward or reverse clutches are reengaged after a shift in gears.

A line 106 couples the spring biassed side of the sump spool 102 to the detent spool 84. During a shift in gears ports 108 in detent spool temporarily couple line 106 to sump through passage 110 in valve body 80. This connection to sump is only temporary, occurring as the detent spool is shifted between adjoining detents. When the detent spool is fully detented ports 108 are blocked.

Both the clutch valve 94 and the sump valve 96 are supplied pressurized hydraulic fluid through line 114 which is coupled to the modulation valve 116 of the third valve body 98. In addition, the sump valve is in fluid communication with the modulation accumulator 118 of the modulation valve 116 through line 120. Pressurized fluid is supplied to modulation valve 116 by speed control valve 82 through the line 112. The modulation valve 98 in turn, controls the flow of the pressurized fluid to line 114.

The modulation accumulator 118 is provided with three springs and controls the positioning of the modulation valve 116. The modulation valve 116 is maintained in an open position by pressurized fluid driving the modulation accumulator piston to the left. The pressurized fluid for driving the modulation accumulator to the left is supplied by the rate of shift orifices 104 of the sump valve 96. When the modulation valve is open, pressurized hydraulic fluid flows from line 112 to line 114.

When the clutch is engaged by the operator, pressurized hydraulic fluid in line 114 is passed through clutch valve 94 to line 100 which directs the pressurized hydraulic fluid to direction control valve 124 located in the third valve body 98. The direction control valve 124 is shifted by the operator for selectively applying the pressurized hydraulic fluid in line 122 to either the forward or reverse clutch.

When shifting from one gear to another, the sump spool 102 is shifted to the left because line 106 is coupled to sump through the detent spool 84. The modulation accumulator 118 forces fluid against the right side of the sump spool 102 through line 120. This restricts the flow of pressurized hydraulic fluid from line 114 to the rate of shift orifices 104. In addition, modulation valve 116 starts to close restricting the flow of pressurized fluid from line 112 to line 114. This reduces the hydraulic pressure in line 114, which reduces the hydraulic pressure transferred through clutch valve 94 and line 100 to direction control valve 124, thereby reducing the hydraulic pressure applied to the forward or reverse clutches.

The relatively conventional power shift transmission illustrated in FIGS. 3 and 4, has been modified by forming a port 130 in first valve body 80 in fluid communication with passage 110; and a port 132 in fluid communication with the right side of the modulation accumulator piston. These two ports 130 and 132 are coupled to one another by line 134. The flow of fluid from the modulator accumulator 118 and passage 110 is controlled by solenoid valve 136.

The solenoid valve 136 is normally biassed into a closed position. The electric switch 70 is electrically coupled to the solenoid actuator of solenoid valve 136. When the switch 70 is closed it produces a declutch signal for energizing the solenoid valve 136 opening the valve and coupling the right side of the modulation accumulator piston to the passage 110 which is coupled to sump.

By coupling the right side of the modulation accumulator piston to sump, the modulation valve is shifted to the right restricting the flow of pressurized fluid from line 112 to line 114. This reduces pressure in lines 114 and 100, thereby reducing hydraulic pressure applied to the forward or reverse clutches. The forward or reverse clutches slip when torque is applied to the final drives in the form of braking force. As the clutches slip the engine does not lug down and stall.

When the operator releases the decelerator pedal 40 the electric switch 70 is opened and the solenoid valve 136 is again closed preventing the flow of fluid to sump. The modulation accumulator is shifted to the left by pressurized fluid passing past the sump spool 102 through the rate of shift orifices 104 to line 120. This allows for a gradual reengagement of the forward or reverse clutches.

Figure 5:
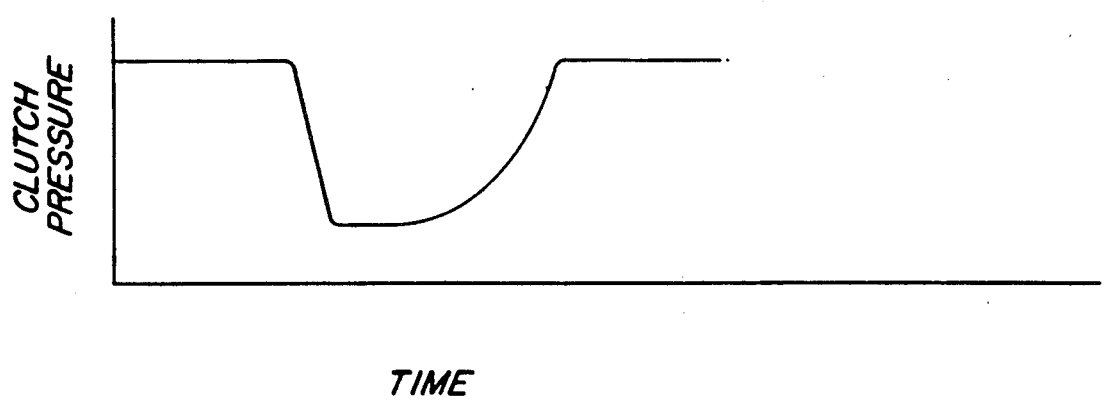
FIG. 5 is a graphical presentation of the forward or reverse clutch pressure during gear shift modulation cycle.
Figure 6:
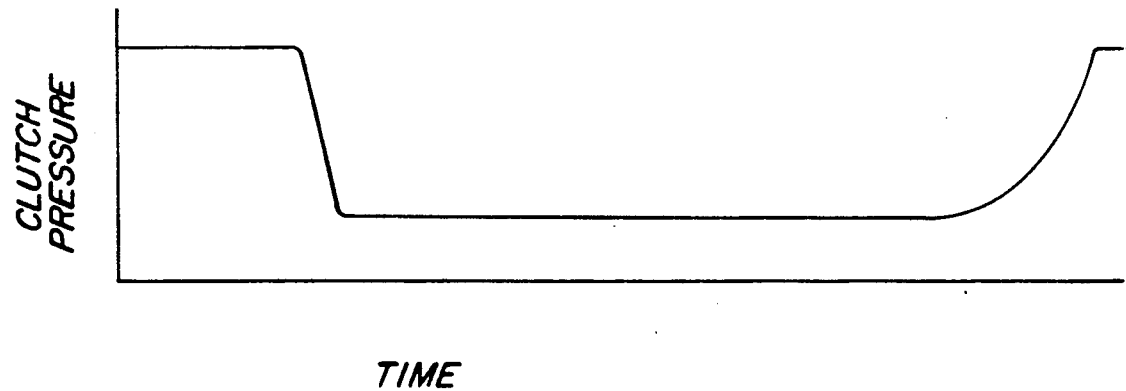
FIG. 6 is a graphical presentation of the forward or reverse clutch pressures during declutching.

FIGS. 5 and 6 are graphical presentations of the hydraulic pressure applied to the forward or reverse clutches. FIG. 5 is a typical shift cycle for the power shift transmission, wherein the pressure applied to the clutches decreases from system pressure to a specified low level. The pressure applied to the engaged forward or reverse clutch is reduced because the right hand side of the modulation accumulator piston is coupled to sump through apertures 108. When the detent spool is fully detented, pressure applied to the clutches gradually increases until system pressure is resumed.

FIG. 6 is identical to FIG. 5 except for the length of time the forward and reverse clutches are at the low pressure level. This length of time reflects the length of time the decelerator pedal is fully depressed. As illustrated, the clutches are reapplied in a gradual manner identical to the manner in which the vehicle is shifted.

The invention should not be limited by the above-described embodiments, but should be limited solely by the claims that follow.

I claim:

1. A work vehicle for performing a work operation, the work vehicle comprising:
   a frame;
   ground engaging means extending from the frame for propelling the vehicle;
   an engine mounted to the frame, the engine having an output speed;
   a direct drive transmission operatively coupled between the engine and the ground engaging means for driving the ground engaging means and propelling the vehicle;
   a decelerator control for controlling the output speed of the engine; and
   means operatively coupled to the decelerator control for declutching the direct drive transmission from the ground engaging means without shifting the direct drive transmission when inching said work vehicle.

2. A work vehicle as defined by claim 1 wherein the decelerator control is a foot pedal pivotally mounted to the frame, the foot pedal having linkage operatively coupled to the engine.

3. A work vehicle as defined by claim 2 wherein the means operatively coupled to the decelerator control comprises an electric switch that is operatively coupled to the linkage of the foot pedal and provides a declutch signal when the foot pedal is fully depressed.

4. A work vehicle as defined by claim 3 wherein the direct drive transmission is a power shift transmission having clutches and a modulation circuit, the modulation circuit controlling how the clutches are applied.

5. A work vehicle as defined by claim 4 wherein the clutches are forward and reverse clutches.

6. A work vehicle as defined by claim 5 wherein the means operatively coupled to the decelerator control further comprises a solenoid valve that is fluidly coupled to the modulation circuit and electrically coupled to electric switch.

7. A work vehicle for performing a work operation, the work vehicle comprising:
   a frame;
   ground engaging means extending from the frame for propelling the vehicle;
   an engine mounted to the frame, the engine having an output speed;
   a power shift transmission operatively coupled between the engine and the ground engaging means for driving the ground engaging means and propelling the vehicle, the power shift transmission having hydraulic clutches for engaging the transmission and a means for gradually increasing hydraulic pressure to the hydraulic clutches after a shift cycle;
   a decelerator control for controlling the output speed of the engine; and
   means operatively coupled to the decelerator control and the means for gradually increasing hydraulic pressure to the hydraulic clutches for reducing hydraulic pressure to the hydraulic clutches when the output of the engine is being reduced and gradually increasing hydraulic pressure to the clutches when the output of the engine is increased without shifting the power shift transmission when inching said work vehicle.

8. A work vehicle as defined by claim 7 wherein the decelerator control is a foot pedal pivotally mounted to the frame, the foot pedal having linkage operatively coupled to the engine.

9. A work vehicle as defined by claim 8 wherein the means operatively coupled to the decelerator control comprises an electric switch that is operatively coupled to the linkage of the foot pedal and provides a declutch signal when the foot pedal is fully depressed.

10. A work vehicle as defined by claim 9 wherein the means for gradually applying hydraulic pressure to the clutches comprises a sump valve having rate of shift orifices and a modulation valve and accumulator.

11. A work vehicle as defined by claim 10 wherein the clutches are forward and reverse clutches.

12. A work vehicle as defined by claim 11 wherein the means operatively coupled to the decelerator control further comprises a solenoid valve that is fluidly coupled to a modulation accumulator and a hydraulic fluid sump, and electrically coupled to the electric switch, the solenoid valve upon receiving a declutch signal from the electric switch fluidly couples the modulation accumulator to the sump valve shifting the modulation valve thereby reducing hydraulic pressure to the clutches.

* * * * *